United States Patent [19]
Cox, Jr.

[11] Patent Number: 6,142,083
[45] Date of Patent: Nov. 7, 2000

[54] TOBACCO AND VEGETABLE SEEDER

[76] Inventor: Arville B. Cox, Jr., 2667 River Rd., Lockport, Ky. 40036

[21] Appl. No.: 09/258,676

[22] Filed: Feb. 26, 1999

Related U.S. Application Data

[60] Provisional application No. 60/076,049, Feb. 26, 1998.

[51] Int. Cl.7 .................................................. A01C 11/00
[52] U.S. Cl. ............................. 111/105; 111/200; 221/252
[58] Field of Search .................................... 111/105, 183, 111/200; 221/252

[56] References Cited

U.S. PATENT DOCUMENTS

| | | | |
|---|---|---|---|
| 997,674 | 7/1911 | Heikes | 111/183 X |
| 1,054,454 | 2/1913 | Scherschel | 111/183 X |
| 1,548,097 | 8/1925 | Query | 221/252 X |
| 1,597,246 | 8/1926 | Query | 221/252 X |
| 1,803,656 | 5/1931 | Schuler | 221/252 X |
| 2,358,208 | 9/1944 | Braden | 111/183 |
| 2,704,685 | 3/1955 | Tyler et al. | 111/200 X |
| 2,765,957 | 10/1956 | Andres | 111/200 X |
| 3,073,486 | 1/1963 | Ratcliffe | 111/200 X |
| 3,307,749 | 3/1967 | Ursetta | 111/200 X |
| 3,446,164 | 5/1969 | Huang et al. | 111/105 X |
| 4,072,251 | 2/1978 | Haung | 111/200 X |
| 4,573,609 | 3/1986 | Tesch, Jr. | 221/211 |
| 4,834,264 | 5/1989 | Siegel et al. | 221/252 X |
| 5,209,170 | 5/1993 | Kobayashi | 111/105 |
| 5,214,550 | 5/1993 | Chan | 360/97.01 |
| 5,225,345 | 7/1993 | Suzuki et al. | 111/200 X |

*Primary Examiner*—Christopher J. Novosad
*Attorney, Agent, or Firm*—Carrithers Law Office; David W. Carrithers

[57] ABSTRACT

A manually operated seeder for depositing seeds in a tray holding numerous seed bed cells containing a growth media, wherein a single seed is deposited in each individual cell simultaneously with a single back and forth stroke.

17 Claims, 11 Drawing Sheets

TOBACCO AND VEGETABLE SEEDER

BACKGROUND OF THE INVENTION

This application claims priority from U.S. Provisional Application Serial No. 60/076,049 filed on Feb. 26, 1998 and hereby incorporated by reference.

The present invention relates to a manually operated seeder for depositing seeds in a tray holding numerous seed bed cells containing a growth media, wherein a single seed is deposited in each individual cell simultaneously with a single back and forth stroke.

Conventional type tobacco and vegetable seeders use vacuum to pull seeds and hold seeds in a selected position wherein a tray containing a plurality of cells are positioned in alignment with the seeds. The vacuum is shut off and the seeds fall in the perspective cells; however, the equipment is costly, and the procedure time consuming. U.S. Pat. Nos. 4,573,609, 5,214,550, hereby incorporated by reference are such seeders. Other seeders require rolling seeds as with the "TENNESSEE POOR BOY" type. With vacuum type seeders there is a problem that due to seed abnormalities they will sometimes drop two or three seeds per cell. These vacuum seeders usually require more than one person to operate the equipment and position the trays in cooperative relation therewith. The vacuum type takes two people to load in a truck to move.

The idea for this seeder of the present invention came from building and using the TENNESSEE POOR BOY type seeder and using the vacuum seeders as well. By using these conventional seeders and understanding their inherent limitations and shortcomings the idea to create or design a better seeder was inevitable.

SUMMARY OF THE INVENTION

The present invention utilizes gravity and requires no electricity thereby eliminating the danger of electrical shock and providing a compact, high speed portable unit. The present invention is faster and easier to operate, seeding trays or flats at the rate of 350 to 450 trays per hour. Another big advantage is that due to the design, only one seed per cell is seeded and the potential for overseeding or underseeding is effectively eliminated. The present invention has a cover to protect seed and keep out wind blown debris which allows the operator to seed in the greenhouse or outdoors near the floatbeds. It weighs less than ten (10) pounds. The present invention is faster than the conventional vacuum seeders and will drop 100% of the seeds correctly every time.

Tests have shown that the seeder of the present invention will seed 10,000 trays without cleaning. Performance is excellent with regard to accuracy and ease of use.

BRIEF DESCRIPTION OF THE DRAWINGS

A better understanding of the present invention will be had upon reference to the following description in conjunction with the accompanying drawings in which like numerals refer to like parts throughout the several views and wherein.

Figure 1:
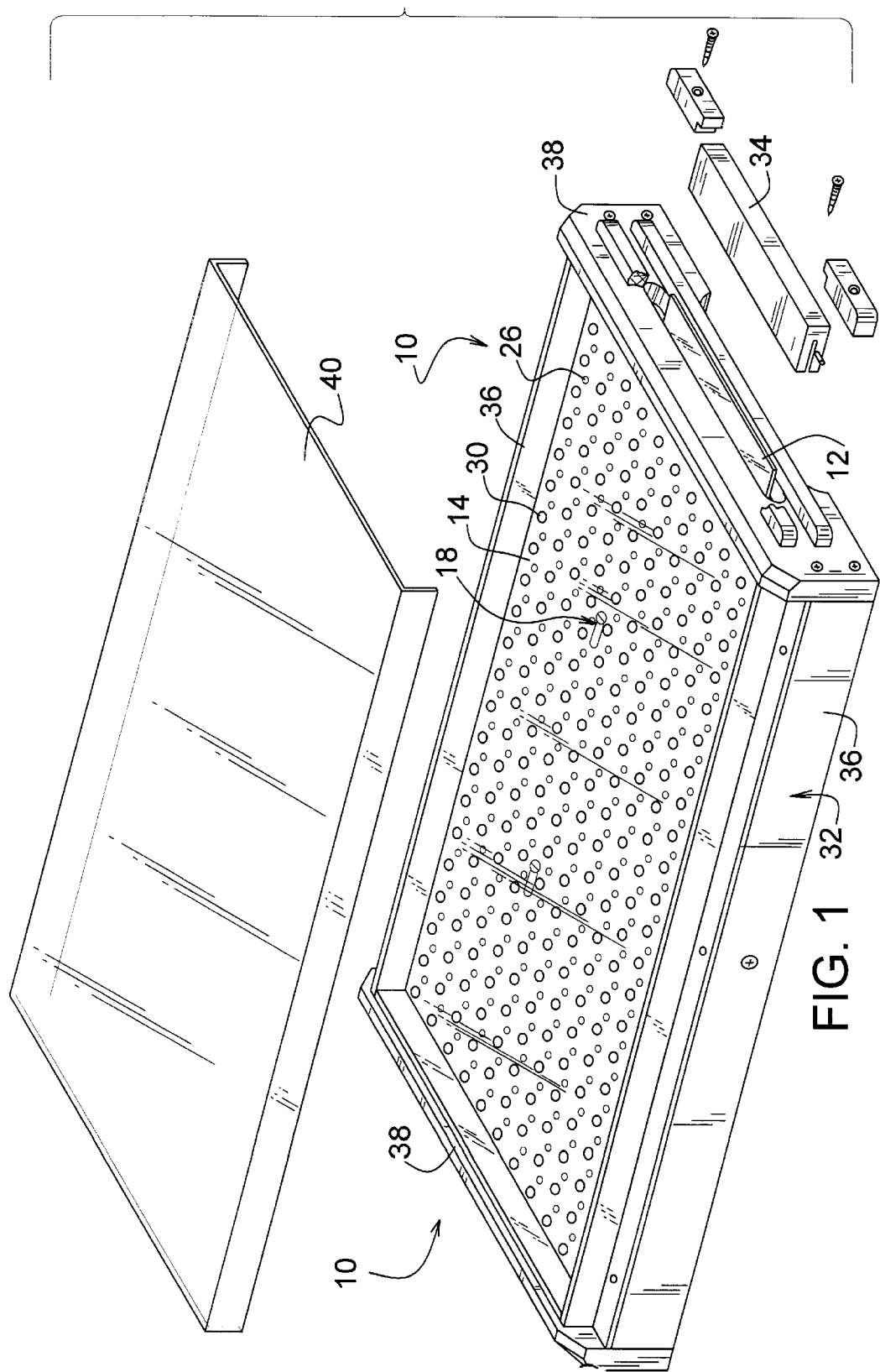
FIG. 1 is a perspective view showing the frame, top tray, handles, stop means, and top lid of the present invention.
Figure 2:
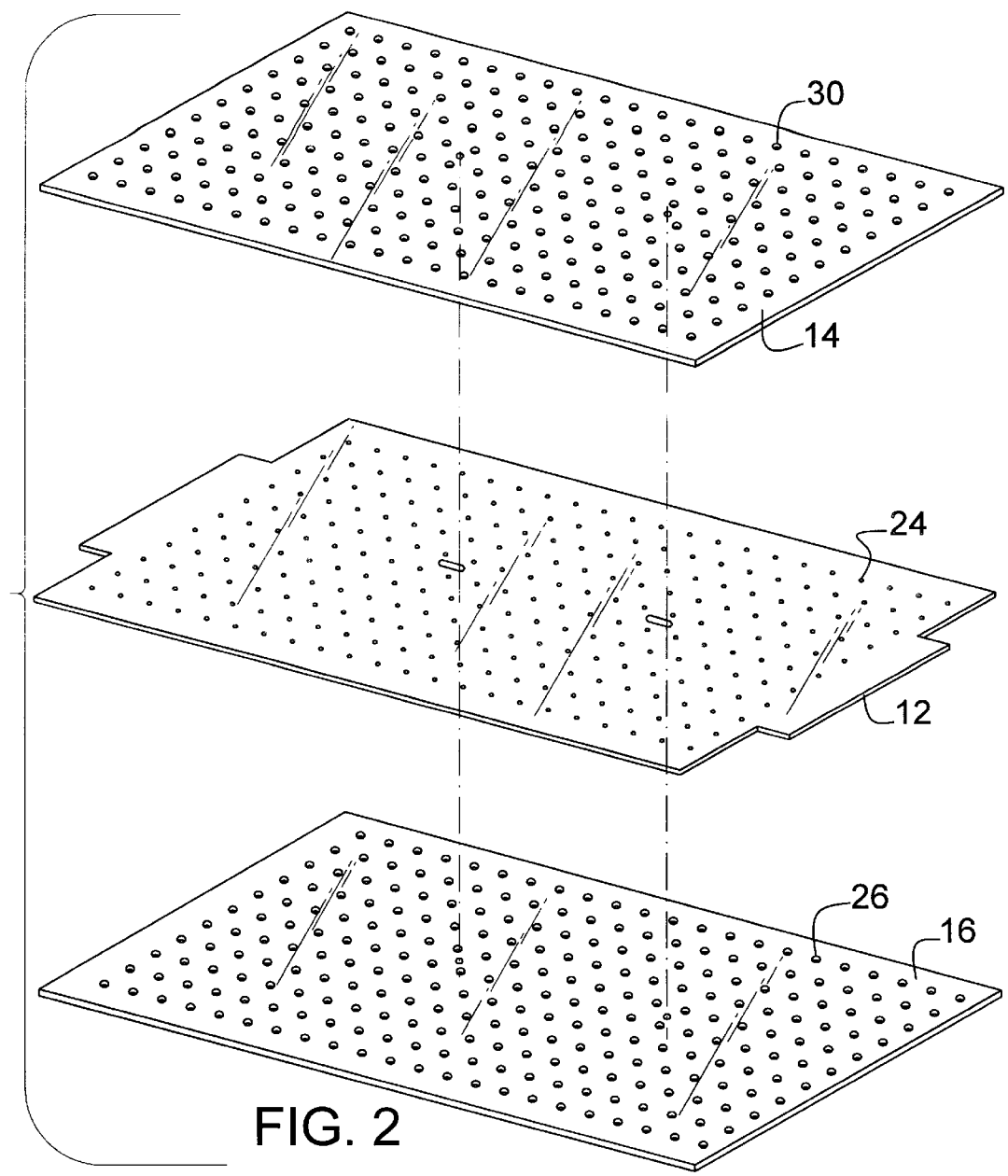
FIG. 2 is an exploded perspective view showing the top feed tray plate having conical "counter-bored" funnel openings for holding a plurality of seeds and a restricted exit bore permitting only one seed to drop through the bore, a middle plant for slidable cooperative alignable engagement with the openings in the top feed plate having openings with the diameter and thickness of the plate sized for a particular single seed to be moved backward and forward with respect to the top plate, and a bottom plate for cooperative slidable alignment with the top plate and middle plate whereby a seed can drop through the bottom plate into a selected aligned cell of a tray.
Figure 3:
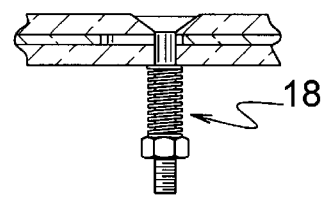
FIG. 3 is a cutaway view showing a screw cooperatively engaging and securing the top plate to the bottom plate wherein a slot in the middle plate allows a predetermined amount of back and forth movement in the x-axis with respect to the top and bottom plate.
Figure 4:
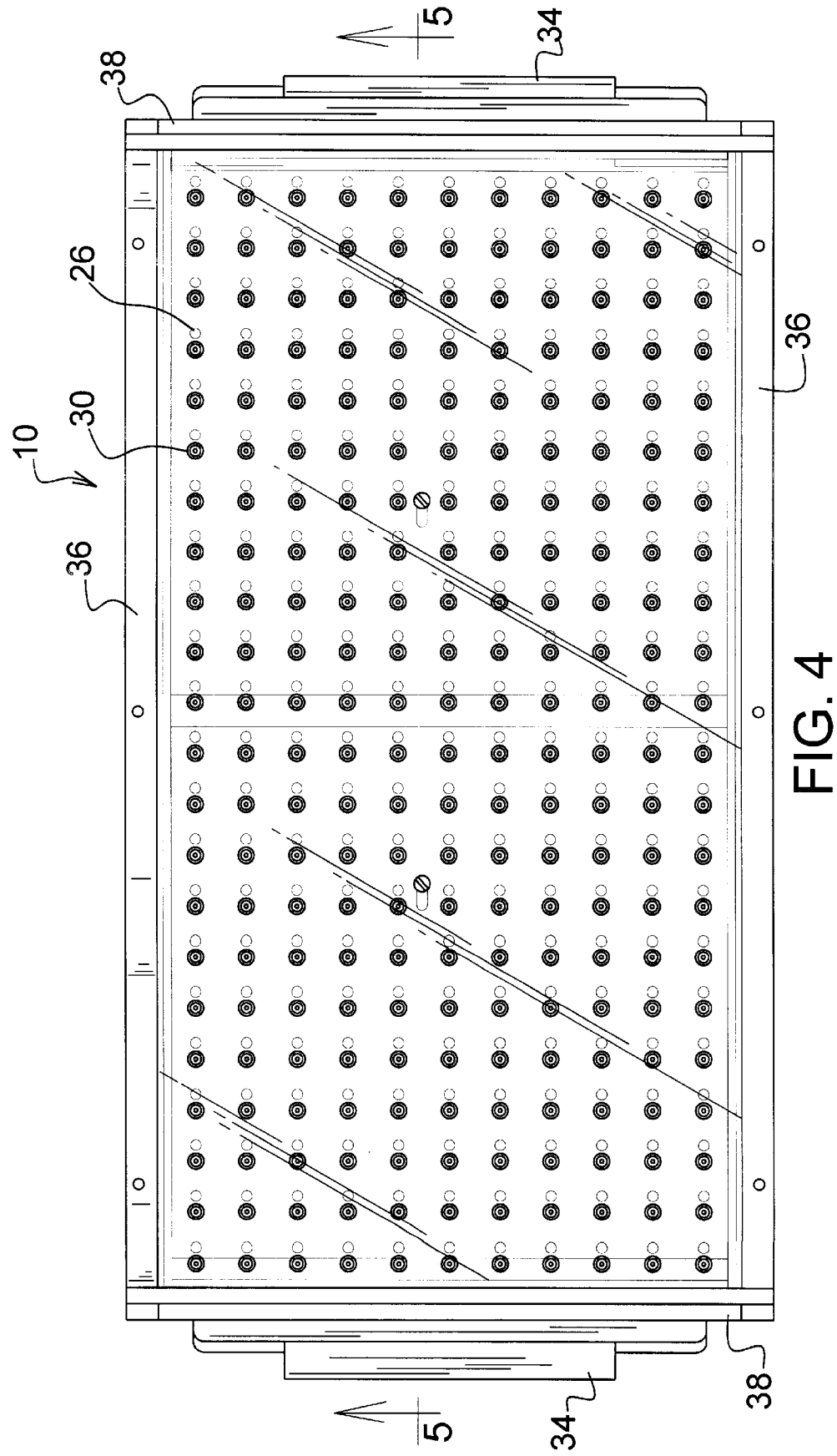
FIG. 4 is a top perspective view of the present invention showing the transparent wind and dust cover in engagement with the frame, the top plate cone shaped funnel bores, and the openings in the middle plate unaligned therewith.

The tobacco and vegetable seeder 10 utilizes three plates. The thickness of the three plexiglass plates as well as the hole sizes in them can be modified to handle various sizes of vegetable and tobacco seeds. The thickness of the middle plate 12 along with the appropriate size hole allows one and only one seed to be transferred from the top plate in order to be dropped into place through the hole in the bottom plate. For tobacco seeds ranging in size from 58/1000 to 60/1000, the 1/16 inch middle plate works well. The use of 1/4 inch plates for the top plate 14 and bottom plate 16 allow several seeds to rest in the reservoir during operation and adds the necessary rigidity for efficient operation. It may be necessary to include the compression spring assembly 18 to insure that the plates remain in contact with one another so that seeds do not get between them other than through the metering holes as intended. The location of the compression spring assembly(s) may be as close to the center of the seeder in any arrangement that does not interfere with the sliding action of the holes.

Figure 7:
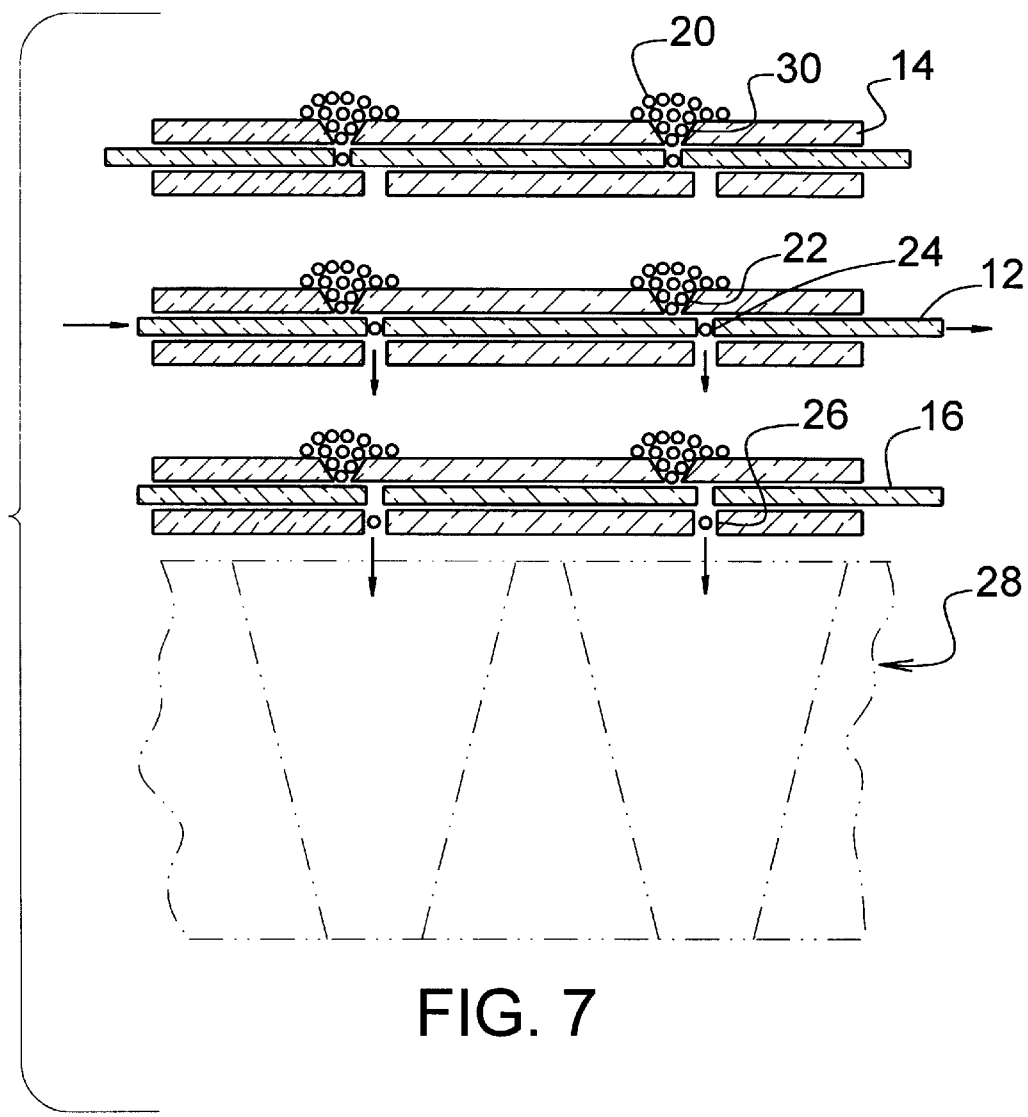
FIG. 7 is a side view of the present invention showing in Step 1 the seeds dropping through the bores of the funnel shaped openings of the top plate and into the aligned holes of the middle plate to rest on the surface of the bottom plate off set for nonalignment of the holes; in Step 2, the middle plate is pulled in the X-axis wherein the seeds held therein are pulled forward upon alignment of the holes with the holes in the bottom plate allow a single seed to fall therethrough and to close the funnel bore opening.
Figure 8:
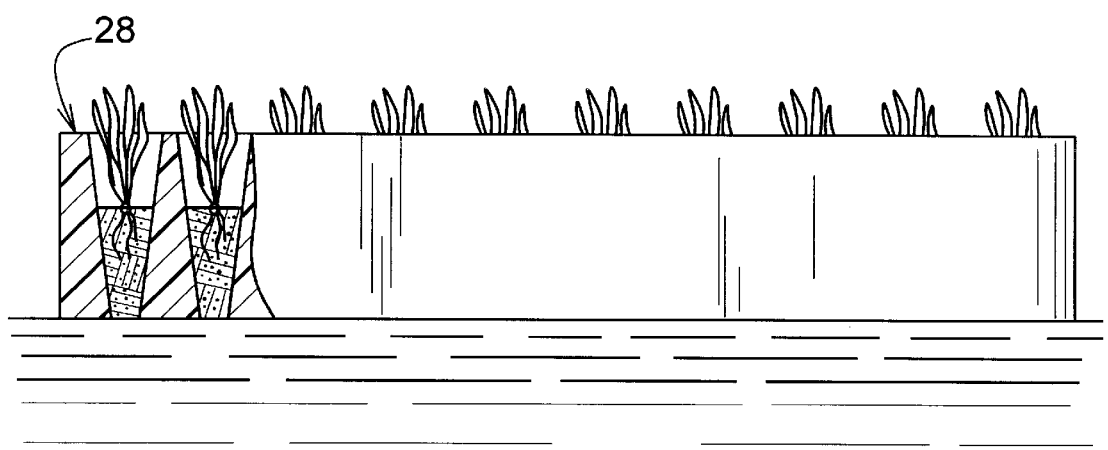
FIG. 8 shows a seed tray having a plurality of cells with growth media therein and a seed sprout growing therefrom.
Figure 9:
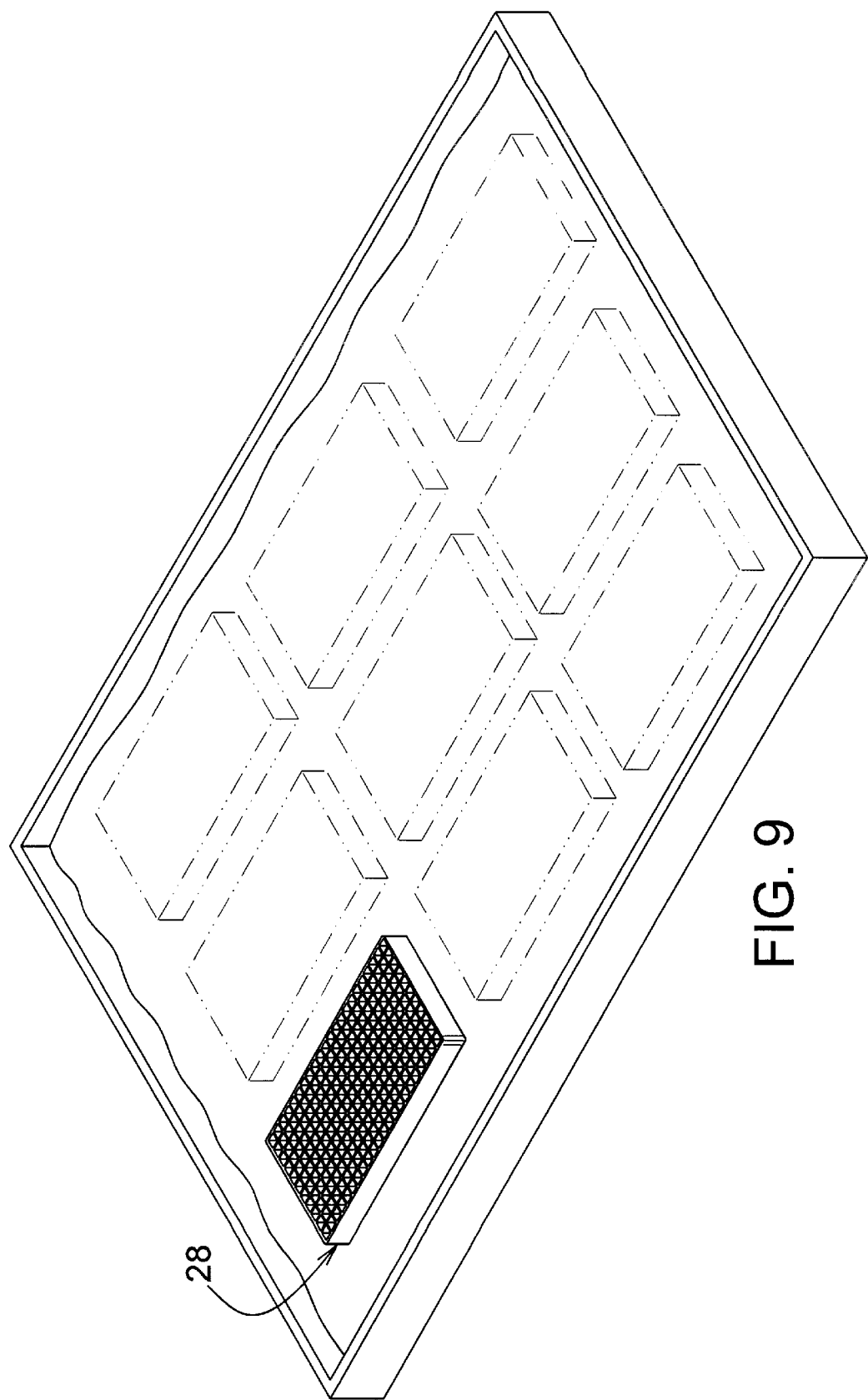
FIG. 9 shows a water bed wherein the floating trays having small openings in the bottom thereof allow water to wick upward into the growth media typically "soil" and nurish the sprouts.

As can be seen in FIG. 7 the seeds 20 are collected into the holes 22 in the upper plate. The middle plate is then slide to the extreme position, which allows ample opportunity for one of the seeds in the hole of the upper plate to drop into the hole 24 in the middle plate. As the middle plate is slide towards the opposite extreme position the seed passes beneath the hole in the upper plate, along the lower plate and is dropped through the larger hole 26 in the bottom plate. The hole placement in all plates are all on the same centers as the center of the seed trays you may wish to seed. The important thing to remember when drilling the holes is to maintain the offset necessary to insure that at no time during operation the hole in the center plate is open to both the top and bottom plates. Also care should be taken to not allow the amount of travel of the middle plate to be excessive enough to allow seeds to drop from the first row of holes into the recess for the handle.

The manner in which the holes are drilled is as follows

Cut the top plate and the bottom plate the same size, 26¾" and 14⅛" wide. Line up the edges even, then slide the top plate ⁵⁄₁₆" from the end of bottom plate. Now lay the thickness, with end cut as shown ¹⁄₁₆ of an inch. Allow the 1⅜" cut handle to stick out past the end of top plate, lining up the 3½" on each side, flush with the end of top plate, leaving the ⁵⁄₁₆" offset. This will be the stop position for the center plate to drop seeds through ¼" holes in bottom plate into the trays 28 to be seeded. Take a small drill bit, ¹⁄₁₆", and drill a pilot hole in four corners on edge to keep plates flush and in line. Put a ¹⁄₁₆" nail in each hole to hold plates in line. Now you are ready to lay out pattern to match the desired trays to be seeded. You need to match the tray you are seeding marking layout with a fine point felt pen on top ¹⁄₁₆ plate. Take a ³⁄₃₂ bit and where the lines cross on layout, up and down plate and across plate, drilling enough to go through the ¹⁄₁₆" plate and start in the next plate. This gives you a pattern on ¼" plate to drill both ¼" plates at the same time. When all holes are drilled, remove the four nails that holds plates in line taking the ¹⁄₁₆" plates off. Put the nails back in the 2¼ plates as they were. Now take the top plate, the one you drilled the ³⁄₃₂ holes in, and tun it over. This will be the top side when finished.

The next step in finishing this plate is take a Dremil drill with ¼" cone shape diamond tool, and start the pint in each hole, just enough to take any burrows off edge of the ³⁄₃₂ holes.

Next remove the diamond tool and put a round toothpick, broken in half, and insert into Dremil drill, turn to a slow speed running it in each hole. This buffs the sides and removes any burrs. This allows the seeds to drop into holes and when center plate is moved to line up with ¼" holes in bottom plate to drop seeds free into tray and also when moved back to fill position under top cells, lets seed enter center plate freely.

Now put the 4¹⁄₁₆" nail back in pilot hole holding the two ¼" plates in line, keeping the ⁵⁄₁₆" offset then drill these with a ¼" diameter bit through both plates at the point of the drill marks of the ³⁄₃₂ on top made till all are drilled then pull out the four pilot nails. Slide the plate from ends until flush on each end then put the ¹⁄₁₆ plate in between these two ¼" plates as they were drilled no other way.

At this point, turn all three plates over, now you are looking at the top plate. Take a felt pen and mark each plate on end as top side, so as not to set any turned the wrong way because this is the arrangement of plates when finished.

Now take a ⅝" countersink 30 in a drill and countersink all the ¼" holes on top side of ¼" plate about ⅛" deep, this allows seeds to roll freely into each ¼" hole or cells freely to feed the small ³⁄₃₂" holes in center plate.

Next, see that the ends of the two ¼" plates are flush, holding them in place by hand. Now slide the center plate you have already cut, flush with the 2¼" plates on end. Now it is very important to slide the center plate the other way while holding by hand until you see down through the top plate the ³⁄₃₂" hole begins to appear. Keep sliding until the ³⁄₃₂" hole goes to the back side of ¼" cell, stop at this point. This is to insure that adequate travel is made when using the seeder. This is the fill position from the ¼" holes in the top plate.

Now take a sharp metal object and scratch a mark on glass, along the end of ¼" top glass the edge on both sides in 3½" to where the 1⅜" starts out for handle. This goes inside the cut of wood handle 34 shown in FIG. 1.

Figure 5:
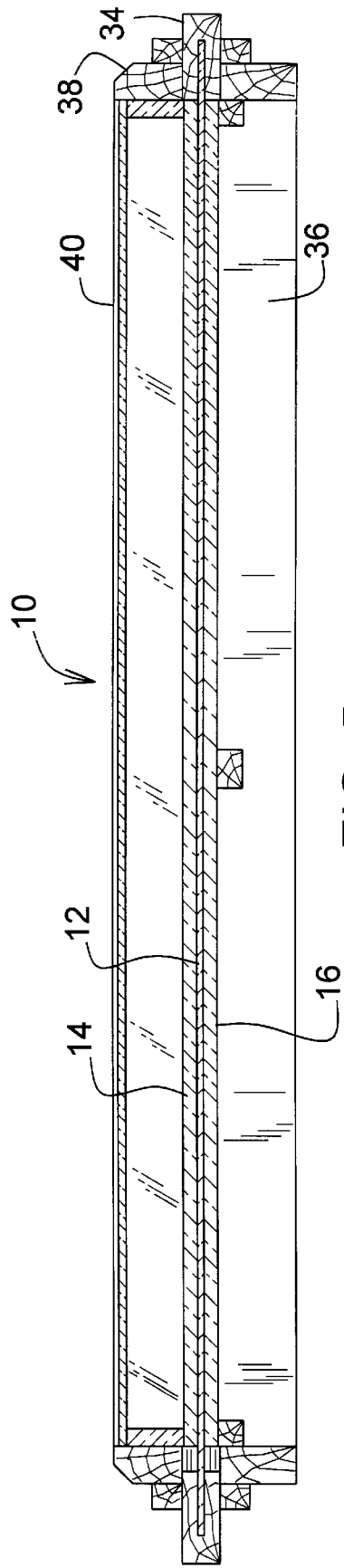
FIG. 5 is a sectional view along lines 5—5 of FIG. 4, showing the cover, top plate, middle plate, and bottom plate, in cooperative engagement with one another within the frame.
Figure 6:
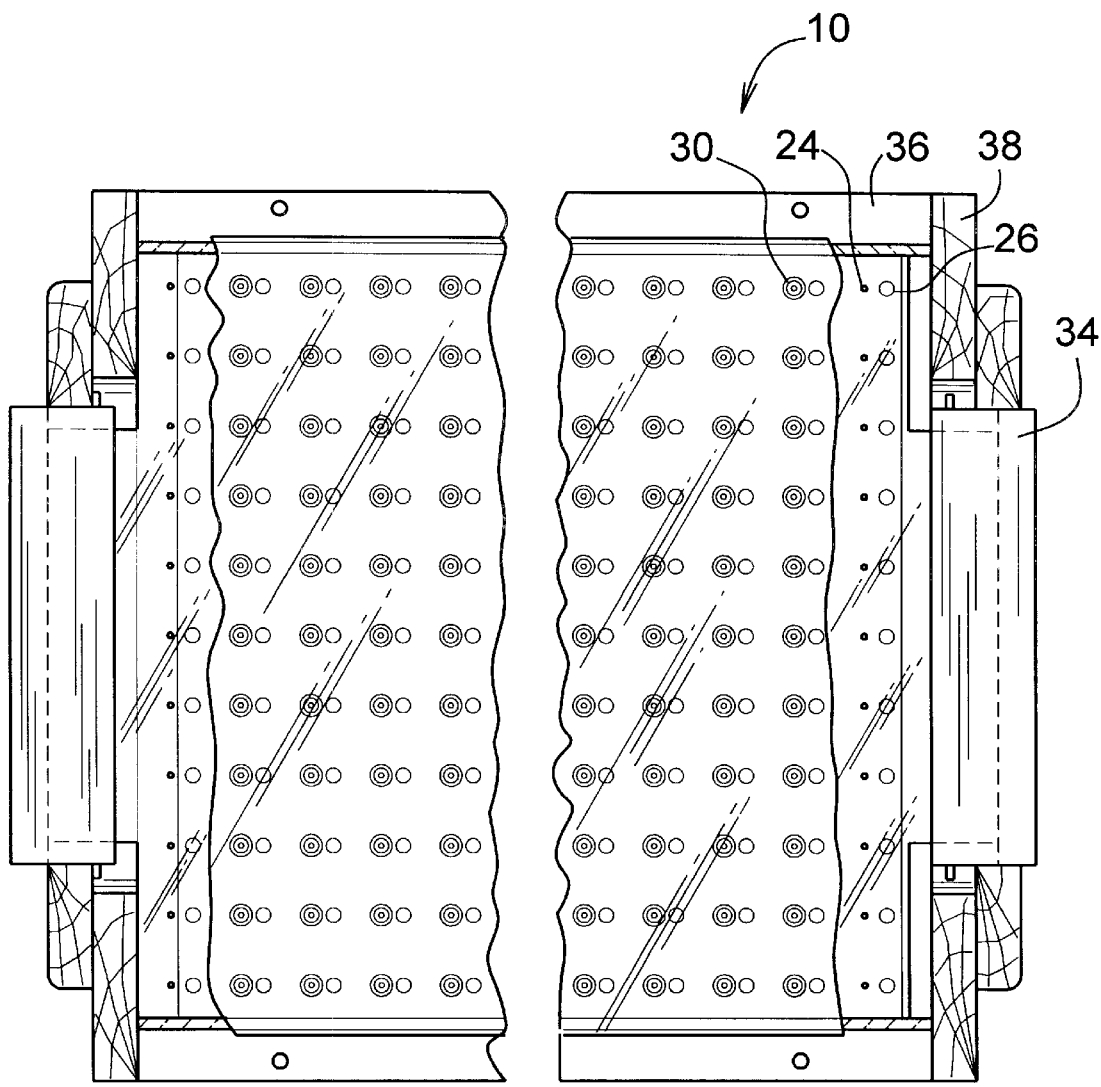
FIG. 6 partical cutaway view of the present invention showing off set alignment of the top, middle, and bottom plate.

After the top plate that has been drilled with a ¼" bit and the countersink is finished you are ready to cement 1⅛"×¼" PLEXIGLAS around the edge for transparent cover and to hold seeds. The best way to set the rails 36 correctly is to install all three plates in frame 32. Put one end on and screw to sides, then place the three plates in position, sliding handle through the opening in the end. In assembly of frame parts No. 3 and 10 are installed with small amount of wood glue and held in place be nails. (see detail on Page 11, FIG. 5).

Now put the ¼"×⅞" plywood strips on each side of frame as shown with the outside edge of plywood flush with edge sides on top held in place by #4 brass screws (for approximate locations see Page 20, FIG. 16). The function of this is to hold down pressure on the plates to keep seeds from going between plates, not too tight so that the center plate won't move freely. Now you can cement the ¼"×26¾" and side rails glass on edge and against the ⅞" plywood strips. This way you know where both sides are cemented in place on top correctly and won't let top plates slide back and forth on seeder.

Next stop is to cement ends inside the ¼" thick side rails and against ends of frame tight. Let dry thirty (30) minutes to one (1) hour. Now you are done.

Page 13 FIG. 7 shows the layout and operation in a cut section of seeder plates. How center plate travels back to fill and other direction to drop seed into tray cells to be seeded below in tray.

TRANSPARENT COVER

The transparent cover 40 is made from 0.090" plexiglas. Heat bend a ¾" lip to form a 90 degree angle to lap over the 1⅛" sides of the seed resevoir. This will keep any debris from getting into the seeder which may cause malfunction during seeding operations. It also allows the operator to see into the top of the seeder at all times to determine if more seed is needed.

The heat bending is done by following the manufacturers instructions included with most heat bending equipment such as BRICK HEAT RH-36 Plastic Bending Heater Element from Columbus, Ohio.

In effect you take a ½" heat strip 36" long, using 110 volts to heat a strip of glass. When heated, place into a jig and bend ¾" to 90 degree angle and let cool. The jig used is simply a ¾"×3×36" board screwed to a piano hinge.

CLEANING AND OPERATING PROCEDURES

If your seeder needs to be cleaned from prior use, you need to do so before you begin seeding. To begin cleaning, remove the two (2) screws and springs in the glass. Remove one end of seeder by taking the two (2) screws out of each side with a Philip screwdriver. Loosen the three (3) brass screws on each side. (these hold pressure down on plate sides and keeps seed from going between plates) Watch closely which end comes out first, to insure that orientation is the same during reassembly. Be sure and put back the same way. DO NOT turn the plates over or arrange them differently or the holes will not line up, and the seeder will not operate properly.

Wash the plates with a glass cleaner or soap and water. After the plates are cleaned and dried, take a toothpick and run in each hole in center plate. DO NOT use metal objects to clean holes. Spray all plates and cover with "STATIC GUARD". Let dry a second or two. Put a light coat of baby powder on both sides of plates. Wipe off baby powder with a soft cloth. (plates only)

You are ready to reassemble plates as they were taken apart. Replace end on seeder. Replace the two (2) screws and springs in the center of plates, with about half the spring collapsed. Then snug up the three (3) brass screws on each side to hold plates together. Slide center plate back and forth, checking holes for alignment and making sure the center plate moves freely, not tightly.

READY . . . SET . . . SEED

Pour your seeds in and over the top of the cells. As you pour your seeds in DO NOT put your hands in to scatter the seeds, this will cause shells to come off some of the seeds. Replace cover and tilt over, so seed will fill all cells. Set seeder on tray and start seeding.

To get a 100% each time you need to slide center plate all the way over to fill position. Then move slightly toward drop position, about 1/16 inch. Slide center plate to drop position hard enough to feel or hear plate bump the other end. This allows a slight jar to assure all seeds have dropped into tray.

When you are finished with your seeder, you will want to remove any left over seeds. Put your thumb on each end of cover. Hold the seeder firmly, tilt on end to one corner. Set seeder down flat. Remove cover, then pour out.

Note that the clear plastic tube 42 around the spring 44 of the seeder support device 46 acts as a shock absorber to limit movement of the spring due to frictional pressure with the tube.

Figure 10:
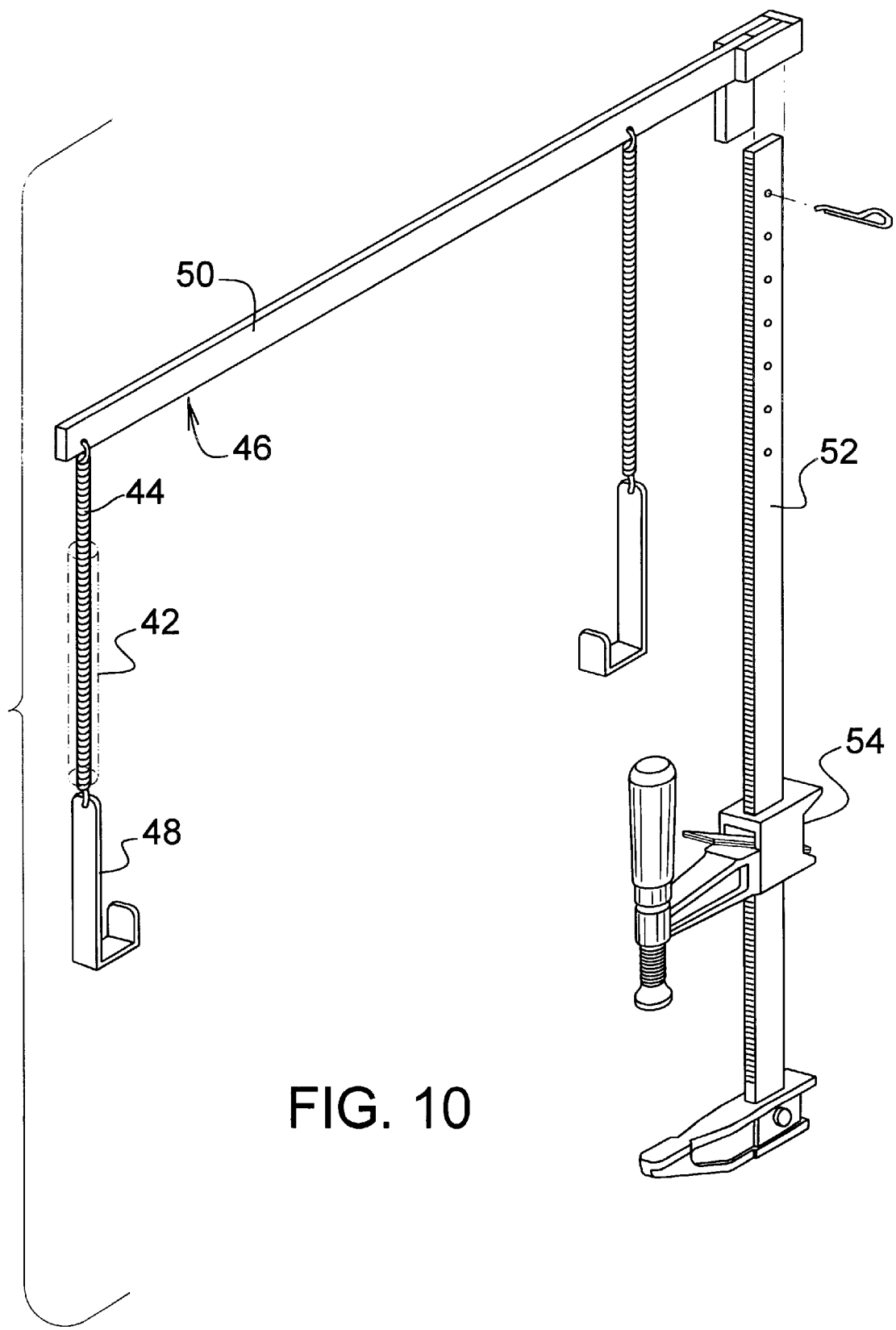
FIG. 10 is an adjustable support arm mechanism for holding the seeder frame above a table and providing a means for sliding the trays in under the seeder.
Figure 11:
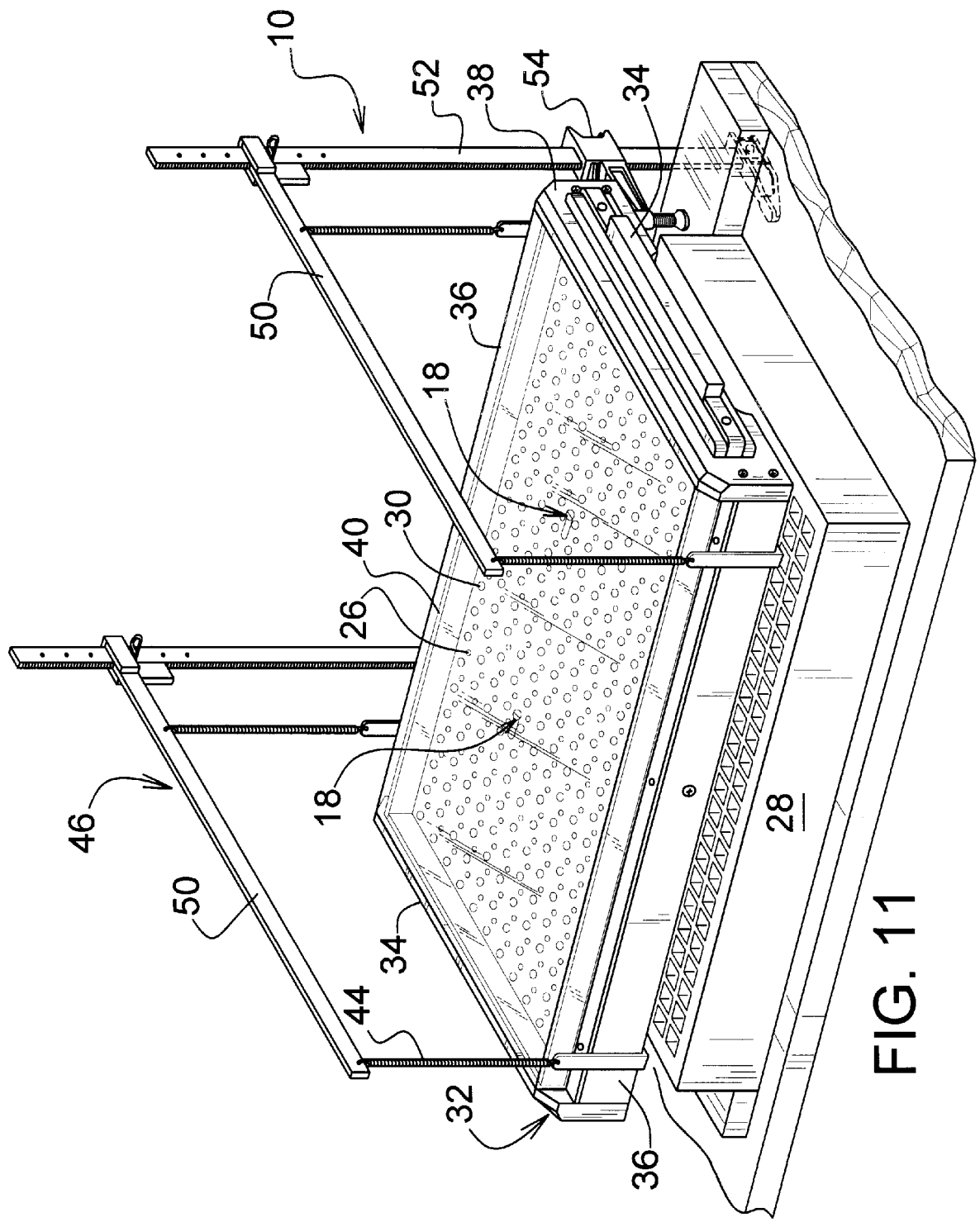
FIG. 11 is a perspective view showing the seeder positioned over a tray suspended by the support arm device.
Figure 12:
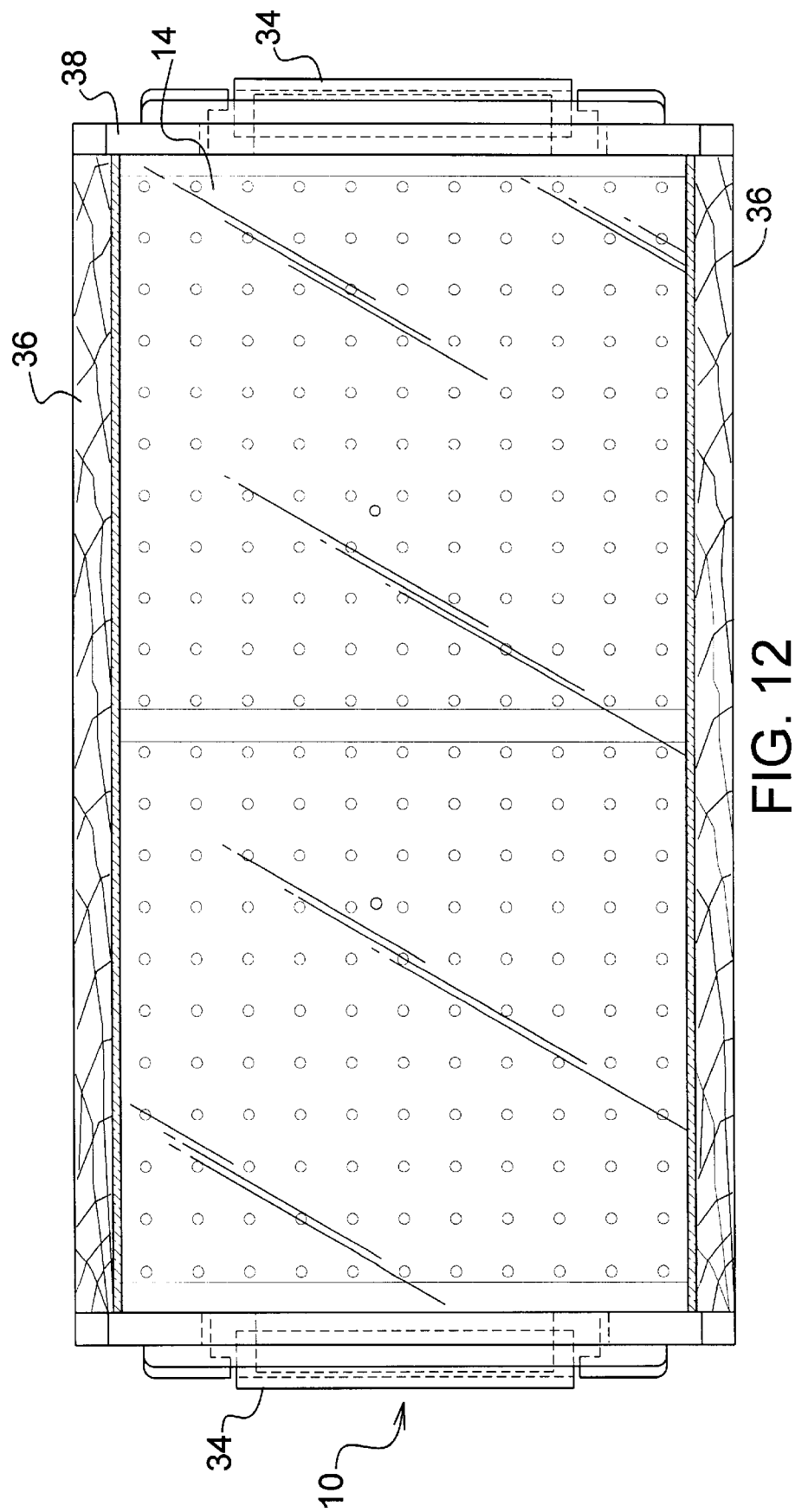
FIG. 12 is a top view of the present invention showing the amount of movement of the middle slide plate back and forth with respect to the frame.

The adjustable support arm mechanism for holding the frame above a table for sliding the tray thereunder is shown in FIGS. 10 and 11 as hooks 48 for holding the frame suspending from a pair of springs extending downwardly from a pair of spaced apart horizontal arms 50 each one being slidably attached to a vertical support member 52 including adjustable clamps 54 for holding the vertical support members erect.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A manually operated portable seeder, comprising:
   a frame;
   a bottom plate having a plurality of holes therein disposed within said frame each one of said holes guiding a single seed to a selected position;
   a middle plate having a plurality of holes therein each of said holes holding a single seed, said middle plate being slidably alignable with said holes of said bottom plate, and said middle plate including opposing ends having handles thereon;
   a top plate having a pluralize of holes therein wherein said holes of said middle plate are alignable therewith;
   said top plate, said middle plate, and said bottom plate providing a plurality of holes, each hole holding only a single seed for simultaneous dropping.

2. The manually operated portable seeder of claim 1, including a tray holding numerous seed bed cells containing a growth media, wherein a single seeed is deposited in each individual cell simultaneously with a single back and forth stroke of said middle plate.

3. The manually operated portable seeder of claim 1, wherein said plurality of holes in said top plate include conical "counter-bored" funnel openings for holding a plurality of seeds therein and have a restricted exit bore permitting only one seed to drop therethrough.

4. The manually operated portable seeder of claim 1, wherein the diameter of said plurality of holes in said middle plate and the thickness of the middle plate is sized for a particular single seed.

5. The manually operated portable seeder of claim 1, wherein a slot in the middle plate is cooperatively engaging a screw disposed therein extending from the top plate to the bottom plate allowing a predetermined amount of back and forth movement in the x-axis with respect to the top and bottom plate.

6. The manually operated portable seeder of claim 2, including an adjustable support arm mechanism for holding said frame above a table for sliding said tray thereunder.

7. The manually operated portable seeder of claim 1, including a compression spring assembly for insuring that said top plate, said middle plate, and said bottom plate are in slidable contact with one another preventing seeds from getting thereinbetween.

8. The manually operated portable seeder of claim 1, wherein said middle plate is 1/16th of an inch in thickness.

9. The manually operated portable seeder of claim 1, wherein said top plate and said bottom plate are 1/4 of an inch in thickness.

10. The manually operated portable seeder of claim 1, wherein said holes in said top plate and said bottom plate are 1/4 of an inch in diameter.

11. The manually operated portable seeder of claim 1, wherein said holes in said middle plate are 3/32 of an inch in diameter.

12. The manually operated portable seeder of claim 1, wherein said holes in said middle plate are 3/32 of an inch in diameter.

13. The manually operated portable seeder of claim 1, including a cover.

14. The manually operated portable seeder of claim 13, wherein said cover is transparent.

15. The manually operated portable seeder of claim 6, wherein said adjustable support arm mechanism for holding said frame above a table for sliding said tray thereunder comprises means for holding said frame suspending from a pair of springs extending downwardly from a pair of spaced apart horizontal arms each one being slidably attached to a vertical support member including means for holding said vertical support member erect.

16. The manually operated portable seeder of claim 1, including applying an antistatic coating to said top plate, said middle plate, and said bottom plate.

17. The manually operated portable seeder of claim 1, including applying a powder coating to said top plate, said middle plate, and said bottom plate.

* * * * *